United States Patent [19]
Utsunomiya et al.

[11] Patent Number: 6,115,351
[45] Date of Patent: *Sep. 5, 2000

[54] PHASE CHANGE OPTICAL RECORDING MEDIUM AND ITS WRITING WITH HIGH RELIABILITY AFTER LONG PERIOD USE AND/OR HIGH ENVIRONMENTAL TEMPERATURE STORAGE

[75] Inventors: Hajime Utsunomiya; Tatsuya Kato; Hiroyasu Inoue, all of Nagano, Japan

[73] Assignee: TDK Corporation, Tokyo, Japan

[*] Notice: This patent is subject to a terminal disclaimer.

[21] Appl. No.: 09/221,125

[22] Filed: Dec. 28, 1998

[30] Foreign Application Priority Data

Dec. 27, 1997 [JP] Japan .................................. 9-368036
Jun. 8, 1998 [JP] Japan ................................. 10-175418
Nov. 25, 1998 [JP] Japan ................................. 10-350764

[51] Int. Cl.[7] ...................................................... G11B 7/24
[52] U.S. Cl. ................. 369/275.2; 428/64.4; 430/270.13
[58] Field of Search .............................. 369/275.1, 275.2, 369/275.4, 50, 274, 288; 428/64.1, 64.4; 430/270.13

[56] References Cited

U.S. PATENT DOCUMENTS 5,276,670  1/1994  Nogami et al. ......................... 369/116
5,545,454  8/1996  Yamada et al. ........................ 428/64.1
5,978,349  11/1999  Yoshinari et al. .................... 369/275.1

FOREIGN PATENT DOCUMENTS 5-159369  6/1993  Japan .
8-124218  5/1996  Japan .
9-7176    1/1997  Japan .

Primary Examiner—Tan Dinh
Attorney, Agent, or Firm—Oblon, Spivak, McClelland, Maier & Neustadt, P.C.

[57] ABSTRACT

Prevented is the reliability loss in phase change optical recording media during high-temperature storage, and also prevented is the phenomenon of self-erase by which a part of record marks having been formed in the media are erased due to the lateral heat diffusion into the recording layer while recording laser beams are irradiated to the media. The optical recording medium disclosed has a recording layer of a phase change type and is applied to driving units for overwriting it at a linear velocity of $V_0$. The medium is so designed as to satisfy the requirement of $1 < V_{max}/V_0 < 1.5$, where $V_{max}$ indicates the linear velocity at which the medium being overwritten has a highest C/N ratio.

12 Claims, 5 Drawing Sheets

RECORDING/REPRODUCING BEAM

RECORDING/REPRODUCING BEAM

RECORDING/REPRODUCING BEAM

RECORDING/REPRODUCING BEAM

RECORDING/REPRODUCING BEAM

RECORDING/REPRODUCING BEAM

RECORDING/REPRODUCING BEAM

PHASE CHANGE OPTICAL RECORDING MEDIUM AND ITS WRITING WITH HIGH RELIABILITY AFTER LONG PERIOD USE AND/OR HIGH ENVIRONMENTAL TEMPERATURE STORAGE

FIELD OF THE INVENTION

The present invention relates to an optical recording medium of a phase change type, and a method for overwriting the optical recording medium.

BACKGROUND OF THE INVENTION

Highlight is recently focused on optical recording media capable of recording information at a high density and erasing the recorded information for overwriting. One typical rewritable (or erasable) optical recording medium is of a phase change type wherein a laser beam is directed to the recording layer to change its crystalline phase whereupon a change of reflectance by the phase change is detected for reproduction of the information. The phase change optical recording media are of great interest since the optical system of the drive unit used for their operation is simple as compared with magneto-optical recording media.

In most phase change recording media, used are chalcogenide materials such as Ge—Te-based materials and Ge—Sb—Te-based materials, which provide a substantial difference in reflectance between crystalline and amorphous phases and have a relatively stable amorphous phase. Apart from those, recently, it has been proposed to use other compounds known as chalcopyrites. Chalcopyrite compounds have been widely investigated as compound semiconductor materials and have been applied to solar batteries and the like. The chalcopyrite compounds are composed of Ib-IIIb-VIb$_2$ or IIb-IVb-Vb$_2$ as expressed in terms of the Groups of the Periodic Table and have two stacked diamond structures. The structure of chalcopyrite compounds can be readily determined by X-ray structural analysis and their basic characteristics are described, for example, in Physics, Vol. 8, No. 8 (1987), pp. 441 and Denki Kagaku (Electrochemistry). Vol. 56, No. 4 (1988), pp. 228. Of the chalcopyrite compounds, AgInTe$_2$ is known usable in the recording layers of optical recording media having a linear velocity of around 7 m/sec or so, by diluting it with Sb or Bi (see Japanese Patent Application Kokai (JP-A) Nos. 3-240590, 3-99884, 3-82593, 3-73384, 4-151286, etc.). In addition to the optical recording media of a phase change type wherein chalcopyrite compounds are used, also known are other optical recording media of a phase change type wherein is formed an AgSbTe$_2$ phase in the recording layers being crystallized, such as those disclosed in JP-A Nos. 4-267192, 4-232779 and 6-166268.

For recording information on such a phase change optical recording medium, a high-power (recording-power) laser beam is irradiated to the recording layer to heat it up to its melting point or higher. The recording layer to which was irradiated the recording power is melted, and then rapidly cooled, whereby amorphous record marks are formed on the layer. On the other hand, to erase the record marks, a relatively low-power (erasing-power) laser beam is irradiated to the recorded layer to heat it up to its crystallizing temperature or higher but lower than its melting point. The record marks to which was applied the erasing power are heated up to the crystallizing temperature or higher, and then gradually cooled, whereby the record marks are changed to crystalline. In that manner, therefore, overwriting is possible on phase change optical recording media by modulating the intensity of the single optical beam to be applied to the media.

Heretofore, the characteristics of phase change optical recording media have been judged as to whether or not the media could have a sufficient C/N ratio at the linear velocity at which they are operated and as to whether or not they could have a sufficient erasability. However, phase change optical recording media having a too high erasability would rather have poor characteristics. The high erasability of those media means that the recording layer of the media is easily crystallized. The easily-crystallizable recording layer is often problematic in that, while the trailing region of record marks is formed thereon, the leading region of the record marks having been formed is cooled due to the lateral heat diffusion, whereby the layer is recrystallized at that leading region. In other words, the leading region of the record marks formed on the recording layer is erased in that condition. This phenomenon is herein referred to as "self-erase". Of recording media having a too high erasability, the C/N ratio is lowered due to such self-erase. For these reasons, the erasability of optical recording media must be optimized.

In JP-A No. 9-7176, disclosed is a method for preventing self-erase that may occur in high-linear-velocity recording media when the media are used at a low linear velocity, in which the pulse pattern from the pulse division of the recording laser beam applied to a recording medium is optimized in accordance with the linear velocity for the medium.

However, as a result of our studies, we, the present inventors found the optimization in designing optical recording media for preventing the self-erase and for increasing the C/N ratio as high as possible brings about another problem. Concretely, the problem with the media having been so designed that they could have a highest C/N ratio at the linear velocity at which they are actually used is as follows: When the media on which record marks were formed are kept in a high-temperature condition at a temperature falling between 60 and 80° C. or so, and are thereafter overwritten on the region of the record marks, the previously-formed record marks could not be satisfactorily erased. If the previously-formed record marks could not be erased, the newly-recorded signals could not be read out correctly, and jitter and error will increase greatly. The inside of media-driving units such as optical disc drives and others is heated at high temperatures of 60° C. or higher while the units are driven, and therefore the media in the driving units are exposed to such high-temperature environment for a long period of time. In that situation, preventing the reduction in the erasability of recording media during high-temperature storage is an important theme.

A proposal to prevent the deterioration of the characteristics of phase change optical recording media during high-temperature storage was made, for example, in JP-A No. 5-159369, in which the dielectric layer formed on the substrate along with the recording layer was made of a composite composed of a chalcogen compound, an oxide and carbon (C). They say that, in the constitution disclosed in JP-A No. 5-159369, the inner stress to be formed inside the dielectric layer was reduced while the adhesiveness between the dielectric layer and the recording layer was increased, whereby the layer films were prevented from being peeled or cracked and the long-term reliability of the medium was ensured. However, in JP-A No. 5-159369, they are silent on the reduction in the erasability of the medium during high-temperature storage and even on the means of preventing it.

SUMMARY OF THE INVENTION

The object of the present invention is to prevent the reliability loss in phase change optical recording media during high-temperature storage, and to prevent the phenomenon of self-erase by which a part of record marks having been formed in the media are erased due to the lateral heat diffusion into the recording layer while recording laser beams are Irradiated to the media.

The object of the invention can be achieved by any of the following (1) to (8):

(1) An optical recording medium having a recording layer of a phase change type, which is applied to driving units for overwriting it at a linear velocity of $V_0$;

the medium being so designed as to satisfy the following requirement:

$$1 < V_{max}/V_0 < 1.5$$

wherein $V_{max}$ indicates the linear velocity at which the medium being overwritten has a highest C/N ratio.

(2) The optical recording medium of (1), in which the recording layer is formed on a substrate, a first dielectric layer is formed between the substrate and the recording layer, a second dielectric layer is formed on the recording layer, and at least the region of the second dielectric layer adjacent to the recording layer contains nitrogen, and to which recording/reproducing beam is irradiated from the substrate.

(3) The optical recording medium of (2), wherein said region consists essentially of zinc sulfide and silicon oxide, or of silicon nitride and/or germanium nitride.

(4) The optical recording medium of any of (1) to (3), which has the first dielectric layer, the phase change recording layer and the second dielectric layer on the surface of the substrate in that order and for which recording/reproducing beam is irradiated to the back surface of the substrate;

the medium satisfying the following requirement:

$$Ac/Aa \geq 0.8$$

wherein Ac indicates the light absorption of the medium at the recording/reproducing beam wavelength in the crystalline region of the recording layer, and Aa indicates the light absorption of the medium at the same in the amorphous region of the recording layer.

(5) The optical recording medium of (4), which, when record marks are formed on its recording layer and the medium is then stored at a temperature higher than room temperature for at least 100 hours and thereafter overwritten on the record marks, has an erasability for the record marks of not lower than 23 dB in terms of its absolute value.

(6) The optical recording medium of (5), which is stored at a temperature falling between 60 and 80° C. after the record marks are formed thereon.

(7) A method for overwriting an optical recording medium having a recording layer of a phase change type, wherein:

the recording medium is overwritten at a linear velocity of $V_0$ that satisfies the following requirement:

$$1 < V_{max}/V_0 < 1.5$$

where $V_{max}$ indicates the linear velocity at which the medium being overwritten has a highest C/N ratio.

(8) The method of (7) for recording an optical recording medium, wherein the recording medium is any one of (1) to (6).

DETAILED DESCRIPTION OF THE INVENTION

Figure 1:
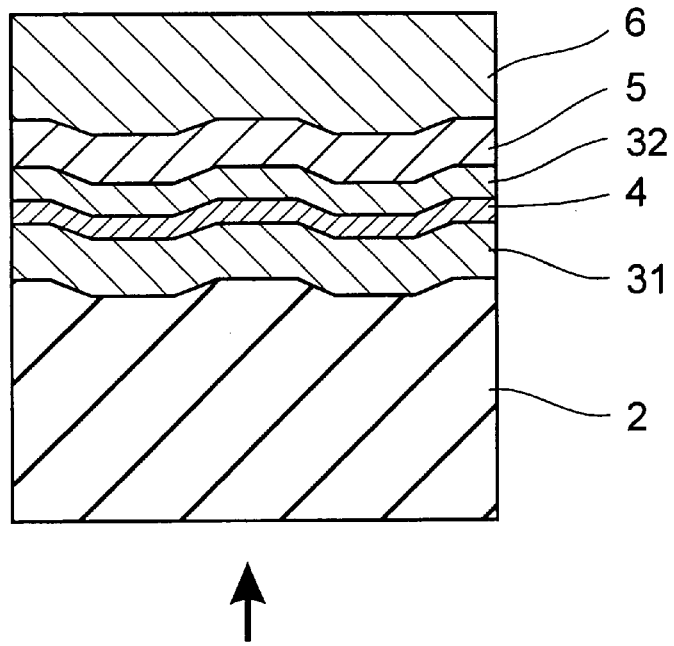
FIG. 1 is a partial cross-sectional view of an embodiment of the optical recording medium (reflection-type structure) of the invention.

In the invention, the medium is so designed that the linear velocity, $V_0$, at which the medium is overwritten and the linear velocity, $V_{max}$, at which the medium being overwritten has a highest C/N ratio satisfy the following requirement:

$$1 < V_{max}/V_0 < 1.5.$$

Under the condition of $1 < V_{max}/V_0$, the reduction in the erasability of the medium is prevented while the medium is stored at high temperatures, and therefore the reliability of the medium is greatly increased. Concretely, for example, when the present invention is applied to a medium having an absorption coefficient control structure, which will be described hereinunder, and when the medium is stored at temperatures higher than room temperature, even at a highest temperature at which the medium is operated or stored, for at least 100 hours, the erasability (this is hereinafter represented in terms of its absolute value) of the medium could be 23 dB or higher. The highest temperature generally falls between 60° C. and 80° C.

The shorter is the record marks to be overwritten on a medium, the better is the erasability of the medium. On the contrary, the longer is the record marks to be overwritten, relatively the worse is the erasability. When record marks are overwritten on a medium at greatest reversal intervals (that is, when longest mark lengths are overwritten thereon) at the linear velocity of $V_{max}$ noted above, the erasability of the medium having been stored at high temperatures will be smaller than 23 dB. In the present invention contrary to this, where record marks are overwritten on the medium at a linear velocity $V_0$ that is lower than $V_{max}$, the erasability of the medium could be still at least 23 dB or more even though the record marks are overwritten at greatest reversal intervals.

In the invention, the linear velocity $V_{max}$ must be higher than the linear velocity $V_0$ at which the medium driving unit is driven, it is necessary that the medium structure is so designed that the recording layer could be gradually cooled, or that the recording layer itself shall have a relatively high crystallization rate. For the gradually-coolable structure, the recording layer shall be thickened, or the dielectric layer to be provided between the recording layer and the reflective layer (for example, the second dielectric layer 32 in FIG. 1) shall be thickened. The crystallization rate of the recording layer may be controlled by modifying the composition of the layer. In addition, by modifying the composition of the dielectric layer to be provided between the recording layer and the reflective layer, the crystallization rate of the recording layer could be increased.

On the other hand, under the condition of $V_{max}/V_0 < 1.5$, the self-erase in the medium may be evaded.

In JP-A No. 9-7176 mentioned above, the method disclosed for preventing the self-erase in media comprises controlling each crossover pulse duration in the recording pulse and controlling the pulse duration power (bias power). In this, however, nothing is referred to relating to the means of defining the linear velocity at which media being driven are to have a highest C/N ratio, to be higher than the practical linear velocity for the media. As opposed to this, in the present invention, the linear velocity $V_{max}$ at which the medium being driven is to have a highest C/N ratio is intentionally defined to be higher than the practical linear velocity $V_0$ for the medium (that is, the overwriting linear velocity at which the driving unit for the medium is operated), whereby the reduction in the erasability of the medium is prevented while the medium is stored at high temperatures.

In the invention, the recording laser beam may be subjected to pulse modulation. However, being different from the method disclosed in JP-A No. 9-7176 noted above, the linear velocity at which the medium being driven is to have a highest C/N ratio in the invention does not correspond to the practical linear velocity for the medium.

PREFERRED EMBODIMENTS OF THE INVENTION

The present invention is described in further detail hereinunder, with reference to its embodiments.

The optical recording medium of the invention is applied to a driving unit for overwriting it at a linear velocity $V_0$. $V_0$ may be a fixed one, or may vary. In other words, the invention is applicable not only to CLV discs and the like for which the linear velocity is a fixed one, but also to CAV discs (for which the angular velocity is fixed) and the like for which the linear velocity is variable. In addition, it may also be applicable to ZCAV discs of each having a plurality of concentric regions to be separately overwritten at the same linear velocity in such a manner that the angular velocity for the regions nearer to the outer periphery is larger. Apart from those, the invention is further applicable to media to be overwritten at a plurality of different linear velocities.

The linear velocity $V_{max}$ at which the optical recording medium of the invention is overwritten to have a highest C/N ratio is to satisfy the following requirement:

$$1 < V_{max}/V_0 < 1.5,$$

preferably, $$1.05 \leq V_{max}/V_0 \leq 1.4.$$

If the ratio $V_{max}/V_0$ is too small, the erasability of the medium is poor when the medium is stored at high temperatures, thereby resulting in the increase in the jitter of the medium. On the other hand, if the ratio $V_{max}/V_0$ is too large, the influence of the self-erase of the medium is to be too great, thereby also resulting in the increase in the jitter of the medium.

Where the invention is applied to a medium for which the linear velocity $V_0$ is not constant, it is desirable that the ratio $V_{max}/V_0$ falls within the defined range at any and every linear velocity $V_0$ at which the medium is overwritten in practical use.

$V_{max}$ for the medium just after its initialization (crystallization of the recording layer just after the production of the medium) or after high-temperature storage may often differ from $V_{max}$ intrinsic to the original medium. In order to remove the influence of such hysteresis on the medium, it is desirable to measure $V_{max}$ after the medium is overwritten at least 10 times.

To overwrite the optical recording medium of the invention, used is a laser beam which has been so modulated that it comprises at least two values for the recording level and the erasing level. The recording-level laser beam may be irradiatied to the medium in the form of pulse. By recording one signal on the medium through at least two-time laser irradiation, heat accumulation on the record marks formed is prevented to reduce the swelling of the trailing region of the record marks (tear-drop), thereby resulting in the increase in the C/N ratio of the medium. On the other hand, through pulse laser irradiation, prevented is the deformation of the record marks that may be caused by self-erase of the medium.

The wavelength $\lambda$ of the laser beam to be used for overwriting the medium and for reproducing the recorded information is not specifically defined. However, for high-density recording, preferred is the following:

$$\lambda \leq 680 \, [nm].$$

The numerical aperture (NA) of the optical lens to be used for overwriting the medium is not specifically defined. However, if NA is too small, high-density recording is difficult. Preferably, therefore, NA is as follows:

$$NA \geq 0.6.$$

The linear velocity $V_0$ of the recording layer of the medium of the invention, relative to the laser beam for overwriting, generally falls between 0.8 and 20 m/sec or so. In consideration of the transfer rate, however, $V_0$ is preferably not lower than 3.47 m/sec, more preferably not lower than 6 m/sec, even more preferably not lower than 9 m/sec.

The specific structure of the phase change optical recording medium of the invention is not specifically defined, provided that the medium has at least a phase change recording layer on a substrate. In general, as in FIG. 1 to FIG. 6, the medium may have a first dielectric layer 31, a recording layer 4 and a second dielectric layer 32 as formed on a substrate 2 in that order, optionally having a reflective layer 5 formed on the second dielectric layer 32, and further optionally a third dielectric layer 33 formed on the reflective layer 5. In FIG. 1 to FIG. 6, recording/reproducing beam is irradiated to the medium through the substrate 2.

In the medium having the structure illustrated, the composition and the thickness of each of the recording layer, the dielectric layers, the reflective layer and others, and even the method for forming those layers may be controlled to thereby vary $V_{max}$ for the medium.

For example, nitrogen and/or oxygen may be introduced into the second dielectric layer to increase $V_{max}$ for the medium, without changing so much the thermal design of the medium (including the thickness of the dielectric layers and the reflective layer of the medium). Therefore, designing a plurality of media for which the practical linear velocity varies is easy, as not requiring any significant change in the basic structure of the media. For this, nitrogen and/or oxygen shall be introduced at least into the region adjacent to the recording layer, but may be introduced into the entire region of the second dielectric layer. For example, where the second dielectric layer has a multi-layered structure such as that to be mentioned hereinunder, nitrogen and/or oxygen may be introduced into only the dielectric layer adjacent to the recording layer. Preferred is nitrogen, since it has few negative influences on the recording layer.

The method for introducing nitrogen and/or oxygen into the second dielectric layer is not specifically defined. For example, preferably employed is any of the following methods: In one method where a second dielectric layer is formed through sputtering, $N_2$ and/or $O_2$ is Introduced into the atmosphere before or at the same time of the start of sputtering, and immediately after the start of the layer formation, the gas introduction is stopped; In another method, $N_2$ and/or $O_2$ is introduced into the atmosphere before or at the same time of the start of sputtering, and immediately after the start of the layer formation, the gas concentration is lowered; and in still another method, $N_2$ and/or $O_2$ is continuously introduced into the atmosphere all the time during the layer formation. Apart from those methods, also employable are other methods. In one method where a recording layer is formed through sputtering. $N_2$ and/or $O_2$ is introduced into the atmosphere, and just before the end of the layer formation, the gas concentration is increased; and in another method, the recording layer formed is discharged in an atmosphere containing $N_2$ and/or $O_2$, and thereafter a second dielectric layer is formed on the recording layer. As the case may be, two or more of those methods may be combined.

Concretely, for example, for forming a second dielectric layer consisting essentially of zinc sulfide and silicon oxide through sputtering, an atmosphere of $Ar+N_2$ may be used. In this case, where the flow rate of $N_2$ is larger, $V_{max}$ for the medium produced may be generally larger. On the other hand, reactive sputtering at a target of Si and/or Ge in a nitrogen-containing atmosphere gives a second dielectric layer consisting essentially of silicon nitride and/or germanium nitride. $V_{max}$ for the medium produced in this case is larger than that for the medium of which the second dielectric layer consists essentially of zinc sulfide and silicon oxide. Also in this case, where the nitrogen flow rate is larger, $V_{max}$ for the medium produced may be generally larger.

The gas to be used for introducing nitrogen and/or oxygen into the second dielectric layer (this is hereinafter referred to as $N_2/O_2$-introducing gas) is not specifically defined. For example, employable is oxidizing gas except $O_2$, concretely including compound gases of NOx, such as $NO_2$, etc.

Where the second dielectric layer is formed through sputtering, the flow rate ratio for the mixed gas of an inert gas such as Ar and the $N_2/O_2$-introducing gas [$N_2/O_2$-introducing gas/(Ar+$N_2/O_2$-introducing gas)] is preferably from 5 to 40%.

Specific embodiments of the optical recording medium of the invention are described in further detail hereinunder.
Structure of FIG. 1, FIG. 2 and FIG. 3 (Reflection-Type Structure)

Figure 2:
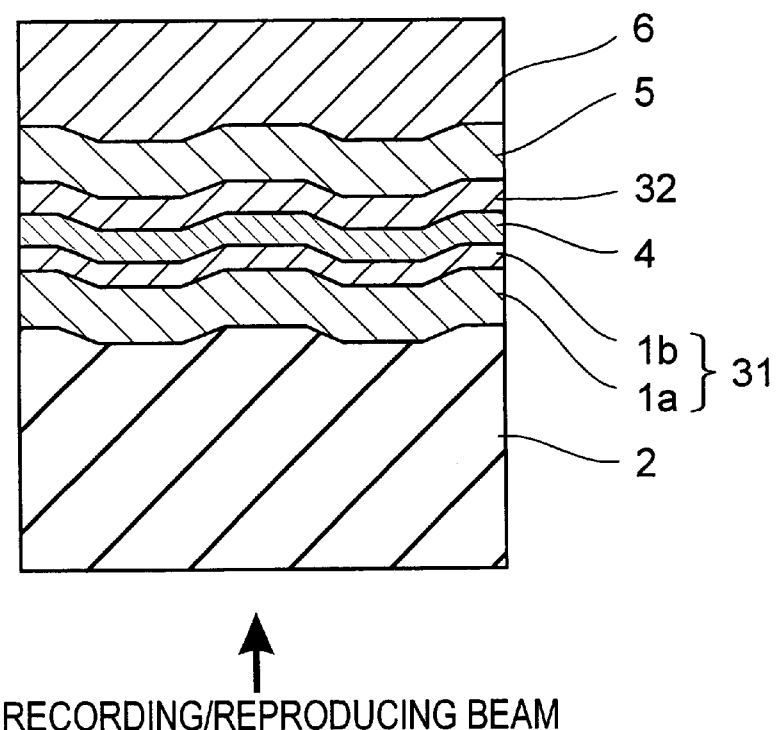
FIG. 2 is a partial cross-sectional view of another embodiment of the optical recording medium (reflection-type structure) of the invention.
Figure 3:
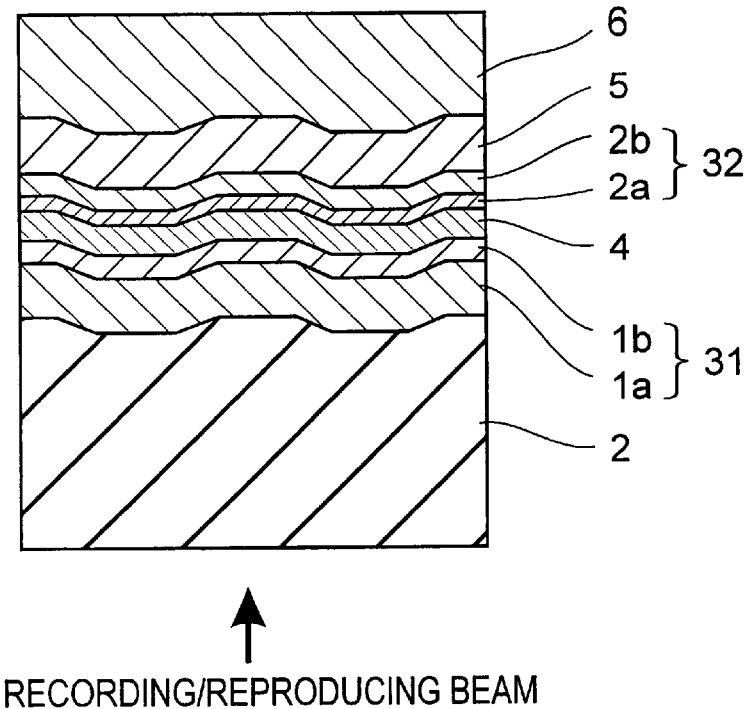
FIG. 3 is a partial cross-sectional view of still another embodiment of the optical recording medium (reflection-type structure) of the invention.

The optical recording medium shown in any of FIG. 1, FIG. 2 and FIG. 3 is a single-side (single-substrate) one, which has a first dielectric layer 31, a recording layer 4, a second dielectric layer 32, a reflective layer 5 and a protective layer 6 as formed in that order on the surface of a substrate 2. The present invention is also applicable to a double side recording medium composed of two such single-side recording media which are adhered to each other through an intervening adhesive layer in such a manner that the protective layer 6 of one single-side recording medium faces to that of the other. It is also applicable to a medium composed of such a single-side recording medium and a protective substrate as adhered thereto through an intervening adhesive layer.

In the optical recording medium of any of FIG. 1, FIG. 2 and FIG. 3, in general, the reflective layer 5 is a relatively thick metal layer, and the medium of that type differs from a medium of an absorption coefficient control structure type to be mentioned hereinunder. The medium of the type illustrated in any of FIG. 1, FIG. 2 and FIG. 3 is herein referred to as a reflection-type structure medium. For the reflection-type structure medium, Ac/Aa to be mentioned hereinunder is generally lower than 0.8. As the case may be, however, reflection-type structure media for which Ac/Aa is 0.8 or larger may also be designed.

Substrate

In the present invention, optical beams are irradiated to the optical recording medium, while being directed to the recording layer 4 through the substrate 2. Therefore, the substrate 2 is desirably of a material that is substantially transparent to optical beams, for example, resin, glass or the like. The resin may include acrylic resins, polycarbonates, epoxy resins, polyolefins, etc. The shape and the size of the substrate are not specifically defined. In general, the substrate may be in the form of a disc. Its thickness may be 0.2 mm or larger, but is generally from 0.5 to 3 mm or so, and its diameter is generally from 50 to 360 mm or so. If desired, a predetermined pattern may be formed on the surface of the substrate for tracking or addressing grooves.

In the optical recording medium of the invention, the grooves may be for the recording track, or the region (land) between the adjacent grooves may be for the recording track. For high-density recording, however, preferred is a structure (land/groove recording structure) in which both the grooves and the land are for the recording track. In the land/groove recording structure, in general, it is desirable that the recording track pitch falls between 0.3 and 1.0 $\mu$m or so.

First Dielectric Layer 31, Second Dielectric Layer 32

The first dielectric layer 31 is to prevent the recording layer from being oxidized, and to shut off the substrate from the heat to be generated by the recording layer to thereby protect the substrate during recording. The second dielectric layer 32 is to protect the recording layer, and, after the recording, this is to assist the release of heat from the recorded layer. The both dielectric layers are to improve the degree of modulation of the medium.

The constitution of the first dielectric layer 31 is not specifically defined. For example, as in FIG. 1, the layer 31 may be a single-layered one. However, in order to increase the overwriting capabilities of the medium, the layer 31 may have a two-layered structure, for example, as in FIG. 2 and FIG. 3. The layer constitution is described hereinunder.

The first dielectric layer 31 in FIG. 2 and FIG. 3 is composed of a dielectric layer 1a adjacent to the substrate 2 and a dielectric layer 1b adjacent to the recording layer 4. The dielectric layer 1a consists essentially of zinc sulfide and silicon oxide. The silicon oxide content of the dielectric layer 1a falls between 2 and 40 mol % (but exclusive of 40 mol %), preferably between 10 and 30 mol %. If the silicon oxide content of the dielectric layer 1a is too large, the refractive index of the layer 1a is too small, resulting in that the medium could hardly have a high C/N ratio. On the other hand, if the silicon oxide content of the layer 1a is too low, the overwriting capabilities of the medium will be poor. The dielectric layer 1a may be homogeneous, or may have a composition-varying structure of such that the silicon oxide content of the layer 1a varies either stepwise or continuously.

The dielectric layer 1b consists essentially of silicon nitride and/or germanium nitride, or essentially of silicon oxide, or essentially of zinc sulfide and silicon oxide, but preferably consists essentially of silicon nitride and/or germanium nitride, more preferably of only silicon nitride or germanium nitride, even more preferably of only germanium nitride. The composition of silicon nitride for the layer is not specifically defined, and, for example, it may be represented by $Si_xN_{1-x}$ (where x is from 0.35 to 0.55). The composition of germanium nitride is not also specifically defined, and it may be, for example, represented by $Ge_xN_{1-x}$ (where x is from 0.35 to 0.55). On the other hand, where the layer consists essentially of zinc sulfide and silicon oxide, the silicon oxide content thereof is at least 40 mol %, preferably at least 45 mol %. If the silicon oxide content of the dielectric layer 1b is too low, the diffusion of Zn and S from the dielectric layer 1a could not be sufficiently retarded. If so, much Zn and S will diffuse into the recording layer and the overwriting capabilities of the medium will be thereby lowered.

Where the second dielectric layer 32 is a single-layered one (see FIG. 2), it is desirable that the second dielectric layer consists essentially of zinc sulfide and silicon oxide, or essentially of silicon oxide, or essentially of a rare earth oxide. Where such a silicon oxide layer or a rare earth oxide layer is formed adjacent to the recording layer, the recording layer may have a high crystallization speed, and therefore $V_{max}$ for the medium may be high. If the crystallization speed of the recording layer is desired to be lowered, the second dielectric layer shall have a two-layered structure, as in FIG. 3. In that case, the second dielectric layer may be composed of a dielectric layer 2b comprising silicon oxide or a rare earth oxide, and a dielectric layer 2a of comprising a mixture of zinc sulfide and silicon oxide, in which the layer 2b is sandwiched between the dielectric layer 2b and the recording layer 4. In this constitution, the dielectric layer 2b may be satisfactorily effective even if it is thin. In this, therefore, the dielectric layer 2a has few negative influences (diffusion of Zn and S) on the recording layer.

Where the second dielectric layer 32 is a single-layered one consisting essentially of zinc sulfide and silicon oxide, the silicon oxide content thereof is preferably at least 2 mol %, more preferably at least 40 mol %. If the silicon oxide content of the second dielectric layer 32 is too low, much Zn and S will diffuse from the layer 32 to the recording layer to have great negative influences on the recording layer.

Where the second dielectric layer 32 is a two-layered one having a dielectric layer 2a that consists essentially of zinc sulfide and silicon oxide, it is desirable that the silicon oxide content of the layer 2a falls between 5 and 60 mol %. If the silicon oxide content of the dielectric layer 2a is too low, much Zn and S will diffuse from the layer 2a to the recording layer to have great negative influences on the recording layer. If, however, the content is too high, the dielectric layer 2a will be poorly effective.

The rare earth elements for the second dielectric layer 32 are not specifically defined, including, for example, Ce, La, Y, Pr, Nd, Pm, Sm, Eu, Gd, Tb, Dy, Ho, Er, Tm, Yb, Lu, etc. At least one of those elements may be used in the layer 32. Preferably used is at least one of Ce, La and Y.

For the defined or preferred range of the silicon oxide content of each dielectric layer noted above, it is necessary that each layer must satisfy the range not only in terms of the mean value in the layer but also in terms of the value throughout or at any site in the layer.

The silicon oxide content as referred to herein is represented by $SiO_2/(ZnS+SiO_2)$, for which zinc sulfide and silicon oxide are in terms of ZnS and $SiO_2$, respectively. This may be determined on the basis of the S content, the Zn content and the Si content of the layer to be measured through fluorescent X-ray analysis or the like. In the case where Zn is excessive relative to S or where S is excessive relative to Zn, it may be considered that such excessive Zn or S will be in the layer in the form of other compounds (ZnO, etc.), or will be in a free form therein. In that case, therefore, a smaller amount of either Zn or S detected will be used in calculating the ZnS content.

The thickness of the first dielectric layer 31 may be preferably from 30 to 300 nm, more preferably from 50 to 250 nm. Having the defined thickness, the layer 31 is more effective in preventing the damage of the substrate, and in increasing the degree of modulation of the medium.

The thickness of the dielectric layer 1b may be preferably from 0.5 to 40 nm, more preferably from 0.8 to 30 nm. However, when the dielectric layer 1b is of silicon nitride, its thickness is preferably smaller than 5 nm, more preferably at most 4 nm, in order that the layer is prevented from being peeled when the medium is stored in a high-temperature and high-humidity condition. When the dielectric layer 1b is of germanium nitride or ZnS—$SiO_2$, it does not peel off even in a high-temperature and high-humidity condition. Therefore, in this case, the thickness of the layer 1b is preferably from 5 to 40 nm, more preferably from 5 to 30 nm in order to increase the barrier property of the layer 1b. Anyhow, if the dielectric layer 1b is too thin or too thick, the overwriting capabilities of the medium will be poor.

The ratio of the thickness of the dielectric layer 1b ($t_{1b}$) to that of the first dielectric layer 31 ($t_1$), ($t_{1b}/t_1$) may be preferably at most 0.5, more preferably at most 0.4. Even though the thickness of the dielectric layer 1b falls within the preferred range noted above, but If the ratio $t_{1b}/t_1$ is too large, the overwriting capabilities of the medium will be poor.

The thickness of the second dielectric layer 32 may fall between 10 and 50 nm, preferably between 13 and 35 nm. If the layer 32 has a thickness falling within the defined range, the medium may be cooled at a higher cooling rate, resulting in that the edges of the record marks formed on the medium are sharper and the jitter of the medium may be much reduced. In addition, another advantage of the medium in which the thickness of the second dielectric layer 32 falls within the defined range is that the degree of modulation of the medium is high.

Where the second dielectric layer 32 is a two-layered one, the thickness of the dielectric layer 23 falls preferably between 2 and 15 nm, more preferably between 3 and 10 nm. If the dielectric layer 2a is too thin, its effect will be poor. On the other hand, however, if the layer 2a is too thick, much Zn and S will diffuse from the layer 2a to the recording layer 4 in high-power recording, thereby having great negative influences on the recording layer. In general, the ratio of the thickness of the dielectric layer 2a ($t_{2a}$) to that of the second dielectric layer 32 ($t_2$), ($t_{2a}/t_2$) may be preferably at most 0.5 or so.

It is desirable that the zinc sulfide-containing dielectric layer contains an element of which the sulfide-forming standard free energy at a temperature falling between 0 and 1000° C. is lower than the ZnS-forming standard free energy (the element is hereinafter referred to as metal element A). The dielectric layer containing metal element A is advantageous in that S and Zn are prevented from being released from the dielectric layer while the medium is repeatedly overwritten, whereby the increase in the jitter of the medium is retarded and the overwriting capabilities of the medium are enhanced.

As the metal element A, preferably used is at least one of Ce, Ca, Mg, Sr, Ba and Na. Especially preferred is Ce, as its sulfide-forming standard free energy is small. For example, at 300 K, the ZnS-forming standard free energy is about −230 kJ/mol; the CeS-forming standard free energy is about −540 kJ/mol; the CaS-forming standard free energy is about −510 kJ/mol; the MgS-forming standard free energy is about −390 kJ/mol; the SrS-forming standard free energy is about −500 kJ/mol; the BaS-forming standard free energy is about −460 kJ/mol; and the $Na_2S$-forming standard free energy is about −400 kJ/mol.

In the dielectric layer, the ratio of the metal element A to all metal elements may be lower than 2 atomic %, preferably at most 1.5 atomic %, more preferably at most 1.3 atomic %. If the ratio of the metal element A is too large, the effect of the dielectric layer to retard the jitter increase during repeated overwriting will could not be realized. In order to satisfactorily realize the effect to be attained by the addition of the metal element A to the dielectric layer, the ratio of the metal element A is preferably at least 0.01 atomic %, more preferably at least 0.03 atomic %. The ratio of the metal element A to all metal elements in the dielectric layer may be measured through fluorescent X-ray analysis, EPKA (electron beam probe X-ray microanalysis) or the like. The overall metal amount in the dielectric layer shall include the, amount of semi-metals such as Si, etc.

In the dielectric layer, the metal element A may be in any form of its simple substance, sulfide, oxide, fluoride, etc.

Each dielectric layer is preferably formed by vapor deposition such as sputtering and evaporation. Especially preferred is sputtering. For example, for forming a dielectric layer consisting essentially of silicon nitride and/or germanium nitride, the sputtering may be effected at a target of silicon nitride and/or germanium nitride, or at a target of Si and/or Ge in a nitrogen-containing atmosphere. The latter is reactive sputtering.

Where a dielectric layer having a composition-varying structure is formed through sputtering, for example, a plurality of targets may be used for multi-sputtering, in which the power ratio to be applied to each target may be varied either stepwise or continuously during the process of from the initial stage of layer formation to the final stage thereof.

In order to introduce the metal element A into dielectric layers, various methods may be employed. For example, where Ce is introduced into a dielectric layer as the metal element A, employable is an additional target of chips of a simple substance of Ce or a compound of $CeO_2$, as put on the essential target for the dielectric layer; or $CeO_2$ or any other Ce compound may be previously added to the essential target. Where any of Ca and Mg is used as the metal element A, an additional target of chips of CaO or MgO may be put on the essential target, which, however, is undesirable since these compounds of CaO and MgO are deliquescent. Therefore, in that case, it is desirable that an additional target of chips of $CaF_2$ or $MgF_2$ is put on the essential target. Where any of Sr, Ba and Na is used as the metal element A, it is also desirable to use their fluoride chips, but not their oxide chips, because of the deliquescence of the oxides. For Ca, Mg, Sr, Ba and Na, their oxides and other compounds may be previously added to the essential target. As the essential target, employable is a composite target of ZnS—$SiO_2$ or the like. If desired, multi-sputtering is also employable herein, in which are used two essential targets of ZnS and $SiO_2$ separately.

For introducing the metal element A into dielectric layers, the sputtering is preferably effected in a mixed atmosphere of Ar and $O_2$. $O_2$ is especially effective in the sputtering where the chips of a simple substance of the metal element A put on the essential target, or in the sputtering where the chips of a compound of the metal element A are put on the essential target, or even in the sputtering where a compound of the metal element A is previously added to the essential target. In that case of using the mixed atmosphere of Ar and $O_2$, the flow rate of $O_2$ into the sputtering atmosphere preferably falls between 5 and 40% in terms of the flow rate ratio of the inert gas such as Ar or the like and $O_2$, $[O_2/(Ar+O_2)]$. Too large flow rate of $O_2$ into the sputtering atmosphere is unfavorable, since the erasing power margin is narrowed too much. This is because, under the condition, the recording power is lowered but the erasing powder does not change.

Recording Layer 4

The recording layer in the medium of the invention is made of a phase-changing material. The composition of the recording layer is not specifically defined. However, the present invention is especially effective to phase change optical recording media in which the recording layer has a Ge—Sb—Te-based composition or an In—Ag—Te—Sb-based composition which will be mentioned below. Especially preferably, the recording layer has a Ge—Sb—Te-based composition.

In the recording layer having a Ge—Sb—Te-based composition, the atomic ratio of the constituent elements, which is represented by:

$$Ge_aSb_bTe_{1-a-b} \qquad (I),$$

is preferably as follows:

$$0.08 \leq a \leq 0.25,$$

and $$0.20 \leq b \leq 0.40.$$

In formula (I), if a is too small, the record marks formed in the medium could hardly be crystallized, resulting in that the erasability of the medium will be low. If, however, a is too large, a large amount of Te is to bond to Ge, and, as a result, Sb is precipitated out. If so, record marks are difficult to form.

In formula (I), if b is too small, the amount of Te in the layer is to be too large. If so, the record marks are readily crystallized while the medium is stored at high temperatures, resulting in that the reliability of the medium is lowered. If, however, b is too large, Sb is precipitated out and record marks are difficult to form.

The thickness of the recording layer having the composition of that type is preferably from 14 to 50 nm. If the recording layer is too thin, the crystal phase is difficult to grow in the layer, thereby resulting in that the reflectance change associated with the phase change will be unsatisfactory. On the other hand, if the recording layer is too thick, the reflectance and the degree of modulation of the medium will be low.

In the recording layer having an In—Ag—Te—Sb-based composition, the atomic ratio of the constituent elements,, which is represented by:

$$[(In_aAg_bTe_{1-a-b})_{1-c}Sb_c]_{1-d}M_d \qquad (II),$$

is preferably as follows:

a=0.1 to 0.3,
b=0.1 to 0.3,
c=0.5 to 0.8, and
d 0 to 0.10,
more preferably,
a=0.11 to 0.28,
b=0.15 to 0.28,
c=0.55 to 0.78, and
d=0.005 to 0.05.

In formula (II), if a is too small, the In content of the recording layer is relatively too low. As a result, the recorded marks formed in the medium will be made poorly amorphous, and the degree of modulation of the medium will be lowered. If so, in addition, the reliability of the medium will also be lowered. If, however, a is too large, the In content of the recording layer is relatively too high. As a result, the reflectance of the regions other than the record marks formed will be low, thereby resulting in that the degree of modulation of the medium is lowered.

In formula (II), if b is too small, the Ag content of the recording layer is relatively too low. As a result, the recrystallization of the record marks formed will be difficult, and the repeated overwriting of the medium will also be difficult. If, however, b is too large, the Ag content of the recording layer is relatively too high. As a result, excess Ag will solely diffuse into the Sb phase while the medium is recorded and the recorded information on the medium is erased. If so, the rewriting durability of the medium is lowered, and, in addition, the stability of the record marks formed and even the stability of the crystalline regions are both lowered, thereby resulting in that the reliability of the medium is lowered. Specifically, the record marks formed will be crystallized too much while the medium is stored at high temperatures, thereby resulting in that the C/N ratio and even the degree of modulation of the medium are lowered. In addition, when the medium is repeatedly recorded, its C/N ratio and even its degree of modulation will also be lowered.

If (a+b) is too small, Te will be too much, and will form a Te phase. The Te phase lowers the crystal transition rate in the recording layer, whereby the information once recorded on the medium is difficult to erase. If, however, (a+b) is too large, it will be difficult to make the recording layer amorphous, thereby often resulting in that no signal could be recorded on the medium.

If c in formula (II) is too small, the reflectance change associated with the phase change could be large in the recording layer, but the crystal transition rate in the layer is greatly lowered whereby the information once recorded on the medium is difficult to erase. If, however, c is too large, the reflectance change associated with the phase change will be small in the recording layer, whereby the degree of modulation of the medium will be lowered.

The element M in formula (II) is at least one selected from H, Si, C, V, W, Ta, Zn, Ti, Ce, Tb, Ge, Sn, Pb and Y. The element M is effective for improving the rewriting durability of the medium, concretely, for preventing the reduction in the erasability of the medium while the medium is repeatedly overwritten. In addition, the element M is further effective for improving the reliability of the medium even under severe conditions, for example, under high humid condition. Of the elements M mentioned above, preferred is at least one of V, Ta, Ce, Ge and Y, as their effect is great.

If d, which indicates the content of the element M in the composition, is too large, the reflectance change associated with the phase change will small and the medium could not have a satisfactory degree of modulation. If, however, d is too small, the element M added will be poorly effective.

It is desirable that the recording layer having the composition noted above comprises only Ag, Sb, Te, In and the optional element M, in which, however, a part of Ag may be substituted with Au, a part of Sb with Bi, a part of Te with Se and a part of In with Al and/or P.

The degree of substitution with Au for Ag is preferably at most 50 atomic %, more preferably at most 20 atomic %. If the degree of substitution is too large, the record marks formed will be too much crystallized whereby the reliability of the medium at high temperatures will lower.

The degree of substitution with Bi for Sb is preferably at most 50 atomic %, more preferably at most 20 atomic %. If the degree of substitution is too large, the absorption coefficient of the recording layer will increase and the optical interference effect thereof will reduce. If so, the difference in the reflectance between the crystalline region and the amorphous region in the layer will reduce, thereby resulting in that the degree of modulation of the medium will lower and the medium could not have a high C/N ratio.

The degree of substitution with Se for Te is preferably at most 50 atomic %, more preferably at most 20 atomic %. If the degree of substitution is too large, the crystal transition rate of the layer will be lowered, thereby resulting in that the medium could not have a sufficient erasability.

The degree of substitution with Al and/or P for In is preferably at most 40 atomic %, more preferably at most 20 atomic %. If the degree of substitution is too large, the stability of the record marks formed will be lowered and the reliability of the medium will also be lowered. The ratio of Al to P for the substitution may be freely determined.

It is noted that the recording layer of this composition system after repetitive rewriting has a coefficient of absorption k of about 3.3 in the crystalline state and about 2.2 in the microcrystalline or amorphous state.

The recording layer of this composition system preferably has a thickness of from 9.5 to 50 nm, more preferably from 13 to 30 nm. If the layer is too thin, the crystal phase will be difficult to grow therein, thereby resulting in that the reflectance change associated with the phase change therein will be low. If, however, the layer is too thick, much Ag will diffuse in the direction of the thickness of the recording layer while record marks are formed and the amount of Ag to diffuse laterally in the layer will be lowered. If so, the reliability of the recording layer will be low. In addition, if the recording layer is too thick, the reflectance and the degree of modulation of the layer will be low.

The composition of the recording layer may be determined through EPMA, X-ray microanalysis, ICP or the like.

Preferably, the recording layer is formed through sputtering. The condition for the sputtering is not specifically defined. For example, where a material comprising a plurality of elements is sputtered, an alloy target may be employed. Alternatively, in that case, employable is multi-sputtering in which are used a plurality of targets for different elements.

Reflective Layer 5

The material of the reflective layer is not specifically defined. In general, the layer may be of a metal material having a high reflectance, for example, a simple substance of Al, Au, Ag, Pt, Cu, Ni, Cr, Ti or the like, or an alloy comprising one or more of those elements. The thickness of the reflective layer is preferably from 30 to 300 nm. If the thickness is smaller than the defined range, the layer could not have a satisfactory degree of reflectance. Even if the thickness is larger than the defined range, the reflectance of the layer will not increase so much, but rather the cost for forming the layer will disadvantageously increase. It is desirable that the reflective layer is formed by vapor deposition such as sputtering and evaporation.

Protective Layer 6

The protective layer is to improve the scratch resistance and the corrosion resistance of the medium. It is desirable that the protective layer is formed of an organic material, typically of a radiation-curable compound or composition having been cured with radiations such as electron beams, UV rays or the like. The thickness of the protective layer generally falls between 0.1 and 100 $\mu$m or so. The layer may be formed in any conventional manner, for example, through spin coating, gravure coating, spray coating dipping or the like.

Adhesive Layer

The adhesive for the adhesive layer is not specifically defined. For example, employable is any of hot-melt adhesives, UV-curable adhesives, cold-curable adhesives and the like. As the case may be, the adhesive may be a pressure-sensitive one.

Figure 4:
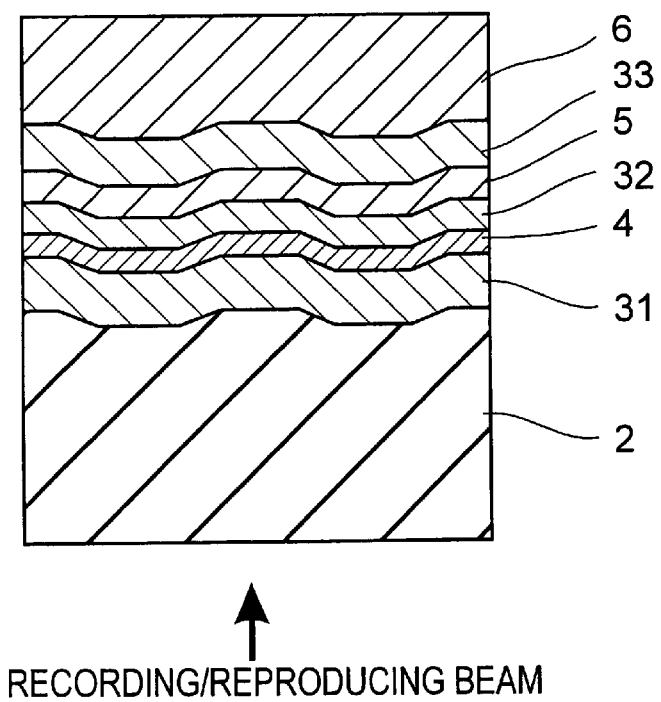
FIG. 4 is a partial cross-sectional view of still another embodiment of the optical recording medium (absorption coefficient control structure) of the invention.
Figure 5:
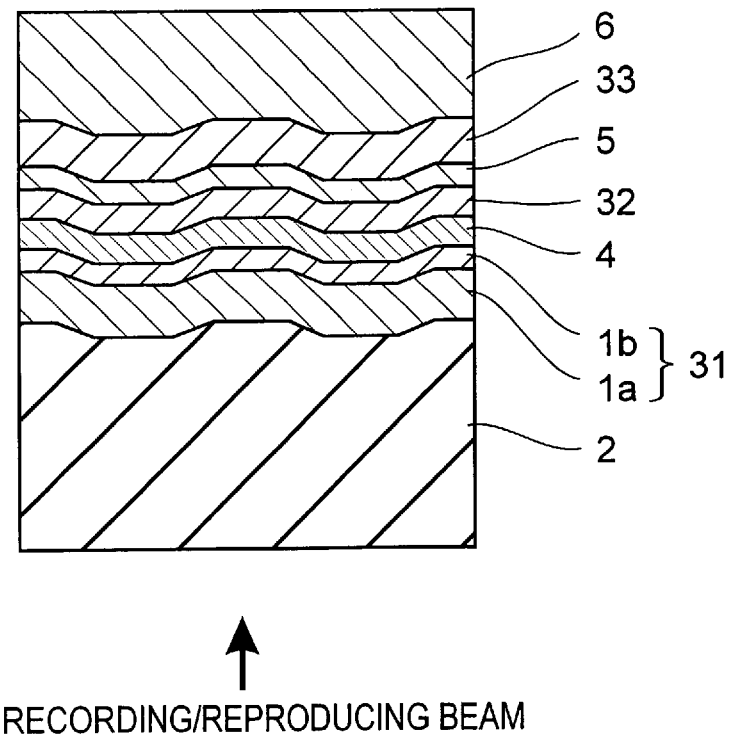
FIG. 5 is a partial cross-sectional view of still another embodiment of the optical recording medium (absorption coefficient control structure) of the invention.
Figure 6:
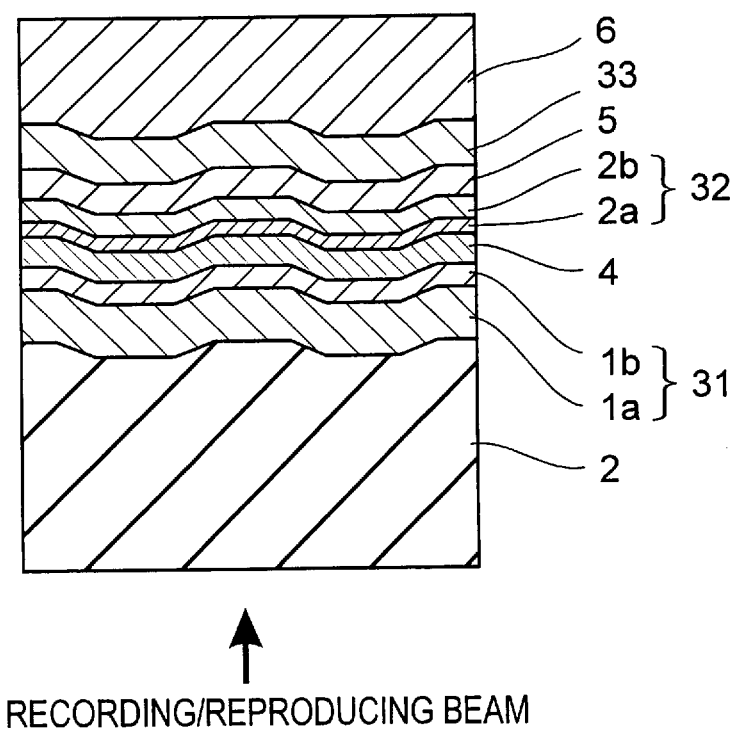
FIG. 6 is a partial cross-sectional view of still another embodiment of the optical recording medium (absorption coefficient control structure) of the invention.

Structure of FIG. 4, FIG. 5 and FIG. 6 (Absorption Coefficient Control Structure)

FIG. 4, FIG. 5 and FIG. 6 show other embodiments of the optical recording medium of the present invention. The structure of the illustrated embodiments of the optical recording medium is herein referred to as an absorption coefficient control structure. The reasons for selecting the absorption coefficient control structure for the medium of the Invention are mentioned below.

For driving the phase change optical recording medium of the invention, utilized is the difference in the reflectance between the crystalline state and the amorphous state of the medium. Therefore, the light absorption (Ac) of the recording layer in the region other than the record marks formed thereon (in the crystalline state) often differs from the light absorption (Aa) thereof in the record marks (in the amorphous state). In general. Ac<Aa. Ac and Aa are the values measured at the wavelength of the recording/reproducing laser beam. The recording sensitivity and the erasability of the medium thus differ from each other, depending on whether the region overwritten is crystalline or amorphous. As a result, record marks of different length and width are formed on the medium overwritten, thus resulting in the increase in the jitter of the medium and often in the recording error. When mark edge recording wherein the information is encoded in the opposite edges of the record marks is adopted for increasing the recording density, the variation in the length of the record marks has greater significance and such variation invites increased errors.

In order to solve this problem, it is desirable that Ac is close to Aa, preferably Ac/Aa≧0.8, more preferably Ac/Aa≧0.9, even more preferably Ac/Aa≧1, most preferably Ac/Aa>1 in consideration of the influence of the latent heat on the recording layer. For this, the thickness of the recording layer and even the thickness of the dielectric layers that sandwich the recording layer therebetween may be controlled. In the medium having a conventional structure, however, the increase in Ac/Aa results in the reduction in the difference between the reflectance (Rc) of the medium in the region other than the record marks and the reflectance (Ra) thereof in the region of the record marks, which is problematic in that the C/N ratio of the medium is lowered.

Given that situation, in JP-A No. 8-124218, proposed was an optical information recording medium comprising a first dielectric layer, a recording layer, a second dielectric layer, a reflective layer, a third dielectric layer and a UV-curable resin layer as laminated in that order on a substrate, in which Ac>Aa, the reflective layer is made of a light-transmitting, extremely thin metal film, Si or Ge, and the third dielectric layer is made of a dielectric substance having a refractive index of larger than 1.5. The proposed medium has the light-transmitting reflective layer and the third dielectric layer having a high refractive index, in which Ac/Aa falls within the defined range and (Rc–Ra) is kept large.

Ac and Aa can be obtained from the optical constant of each layer including the recording layer, the dielectric layers, the reflective layer and others, and from the wavelength of the recording/reproducing laser beam.

In the optical recording medium illustrated in any of FIG. 4, FIG. 5 and FIG. 6, the constitution of the reflective layer 5 is the same as that of the reflective layer in JP-A No. 8-124218 noted above, and a third dielectric layer 33 is provided between the reflective layer 5 and the protective layer 6. The illustrated medium is a single-side recording medium. As in the case of the reflection-type structured media mentioned hereinabove, two media of the absorption coefficient control structure type may be adhered to each other to form a double side recording medium, or a protective substrate may be adhered to each medium of the absorption coefficient control structure type.

In FIG. 4, FIG. 5 and FIG. 6, preferably, the reflective layer 5 is formed of an extremely thin metal layer having a high light transmittance, or of Si, Ge or the like having a high light transmittance for the near-infrared to infrared region that includes the recording/reproducing wavelength range. The thickness of the reflective layer may be so determined that the absorption difference between the region of the recording layer not having the record marks formed thereon and the region thereof having the record marks can be suitably corrected. The preferred thickness of the reflective layer greatly differs, depending on the material constituting the layer. Therefore, the thickness of the reflective layer may be suitably determined, in accordance with the material of the layer. For example, the thickness of the reflective layer made of a metal such as Au or the like may be preferably at most 40 nm, more preferably between 10 and 30 nm; and that of the layer made of Si or Ge may be preferably at most 80 nm, more preferably between 30 and 70 nm. If the reflective layer is too thin, the C/N ratio of the medium will be lowered. If, however, too thick, the absorption-correcting effect of the medium will be poor.

Where the reflective layer is formed of a metal, preferably used is Au or an Au alloy. Preferably, the Au alloy consists essentially of Au and contains at least one of Al, Cr, Cu, Ge, Co, Ni, Mo, Ag, Pt, Pd, Ta, Ti, Bi and Sb.

It is desirable that the reflective layer is formed by vapor deposition such as sputtering and evaporation.

The third dielectric layer 33 which is optionally formed on the reflective layer 5 is preferably made of a material to have a refractive index higher than that of the protective layer 6. Providing the third dielectric layer of that type enlarges the ratio Ac/Aa, while still keeping the reflectance difference large between the region of the record marks and the region with no record marks, as in the invention disclosed in JP-A, No. 8-124218 noted above.

The material for the third dielectric layer is not specifically defined. Any dielectric materials referred to hereinabove for the other dielectric layers are employable for forming the third dielectric layer. Preferably, however, the third dielectric layer consists essentially of zinc sulfide and silicon oxide.

The thickness of the third dielectric layer preferably falls between 30 and 120 nm, more preferably between 40 and 90 nm. If the third dielectric layer is too thin, the signal-outputting power of the medium will be low. If, however, too thick, the signals in the adjacent tracks will be erroneously erased (cross-erase).

To the medium having the structure noted above where the reflective layer is a light-transmitting one to control Ac and Aa, in general, a recording/reproducing laser beam is irradiated, while being directed to the surface of the transparent substrate, and the thus-irradiated ray partly passes through the medium and goes outside from the reflective layer. The light transmittance of the medium, or that is, the ratio of the light transmitted through the medium to the light applied to the medium is generally not smaller than 1% or so, preferably not smaller than 3% or so. The light transmittance is measured for the structure having only the inorganic layers formed on the transparent substrate, concretely for the illustrated structure not having the protective layer 6. Accordingly, the light transmittance indicates the result of the multi-reflection at the inorganic layers including the recording layer, the dielectric layers, the reflective layer, etc. The light transmittance can be measured through spectrometry. The region to be measured for the light transmittance is not specifically defined, and it may be the crystalline area or the amorphous area of the medium. In general, the crystalline region with no grooves (the mirror region) may be measured for the light transmittance.

In the optical recording medium of any of FIG. 4, FIG. 5 and FIG. 6, the substrate 2, the recording layer 4 and the protective layer 6 may be the same constitutions as those in the medium of any of FIG. 1, FIG. 2 and FIG. 3. In the former, however, the thickness of the recording layer 4 is preferably from 10 to 50 nm.

The constitution of the first dielectric layer 31 and that of the second dielectric layer 32 in the absorption coefficient control structure medium are not specifically defined. For example, as in FIG. 4, the layers may have a single-layered structure. However, for enhancing the overwriting capabilities of the medium, the layers may have a laminated structure as in FIG. 5 and FIG. 6. Preferable laminated structures of the layers are mentioned below.

It is desirable that the constitution of the first dielectric layer 31 is the same as that of the first dielectric layer in the reflection-type medium, as in FIG. 2 and FIG. 3.

The second dielectric layer 32 may have a single-layered structure (see FIG. 5), or may have a laminated structure (see FIG. 6). In any case, it is desirable that the region of the second dielectric layer 32 that is adjacent to the recording layer 4, concretely the entire region of the second dielectric layer 32 in FIG. 5 or the dielectric layer 2a in FIG. 6 consists essentially of germanium nitride and/or silicon nitride, or of a rare earth oxide, or of silicon oxide, or of zinc, sulfide and silicon oxide, but preferably, the region consists of germanium nitride and/or silicon nitride, or of zinc sulfide and silicon oxide, more preferably of germanium nitride or silicon nitride. Of the region consisting essentially of zinc sulfide and silicon oxide, the silicon oxide content is preferably at least 40 mol %, more preferably from 40 to 80 mol %, even more preferably from 40 to 60 mol %. If the silicon oxide content of the region is too low, much Zn and S will diffuse into the recording layer to have great negative influences on the recording layer. If, however, the silicon oxide content is too high, the second dielectric layer will peel off while the medium is initialized or overwritten.

The rare earth element for the second dielectric layer 32 is not specifically defined, including, for example, Ce, La, Y, Pr, Nd, Pm, Sm, Eu, Gd, Tb, Dy, Ho, Er, Tm, Yb, Lu and the like. Any one or more of those elements may be used for forming the layer 32. Preferably used is at least one of Ce, La and Y.

In FIG. 6, the composition of the dielectric layer 2b to be formed on the dielectric layer 2a is not specifically defined. In general, the layer 2b may consist essentially of zinc sulfide and silicon oxide, of which the silicon oxide content is not specifically defined but preferably falls between 2 and 40 mol % (exclusive of 40 mol %).

The thickness of the second dielectric layer 32 may fall between 10 and 50 nm, preferably between 13 and 35 nm. The medium in which the thickness of the second dielectric layer falls within the defined range may be cooled at a higher cooling rate, resulting in that the edges of the record marks formed on the medium are sharper and the jitter of the medium may be reduced. In addition, another advantage of the medium in which the thickness of the second dielectric layer falls within the defined range is that the degree of modulation of the medium is high. The region of the second dielectric layer that is adjacent to the recording layer (for example, the dielectric layer 2a in FIG. 6) preferably has a thickness of not smaller than 1 nm, more preferably not smaller than 5 nm. If the region is too thin, its barrier effect will be poor.

Figure 7:
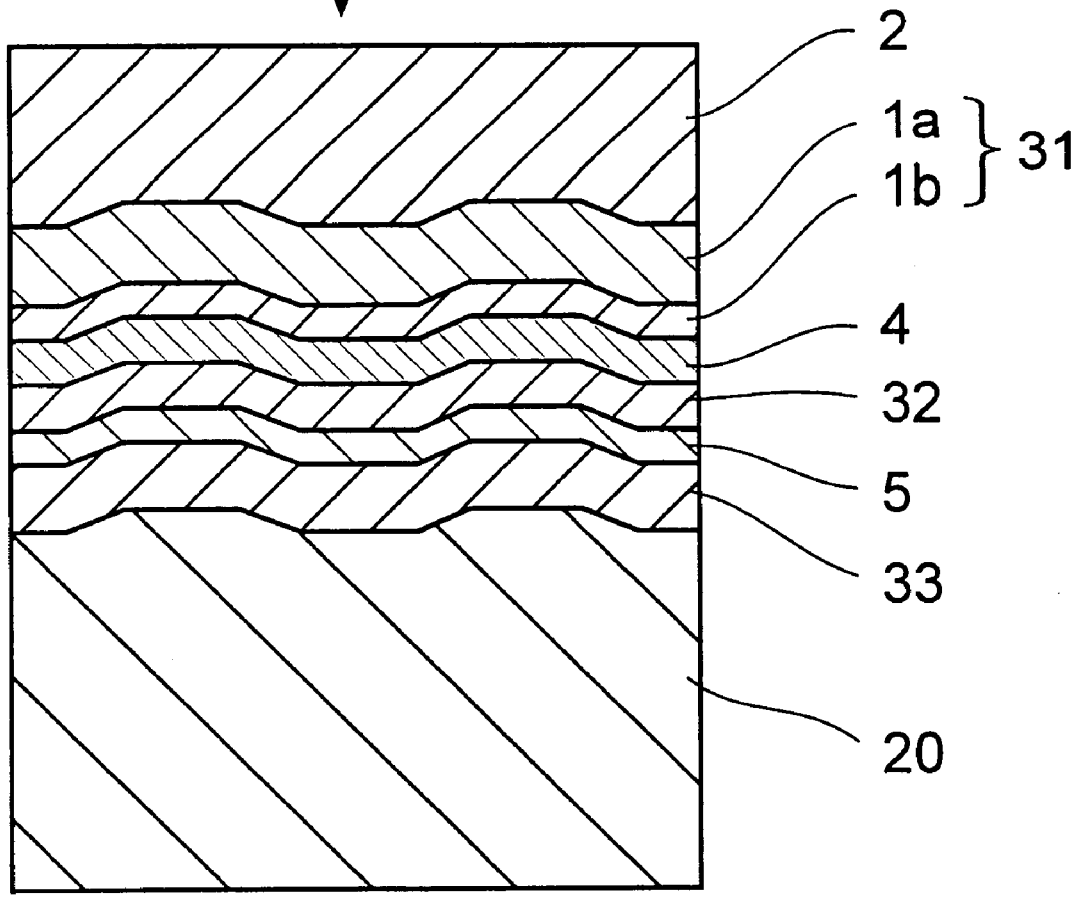
FIG. 7 is a partial cross-sectional view of still another embodiment of the optical recording medium (absorption coefficient control structure) of the invention.

Structure of FIG. 7

In the structure embodiments of FIG. 1 to FIG. 6, the substrate 2 is made of a resin plate or a glass plate of which the thickness is enough to retain its shape without being supported by any other member. Apart from those, the invention is also applicable to an optical recording medium of such that its substrate is thinned in order to increase the recording density. A thin substrate of that type is employable in any of reflection-type structure media and absorption coefficient control structure media. One structure embodiment comprising such a thin substrate is shown in FIG. 7.

The optical recording medium of FIG. 7 has an absorption coefficient control structure, comprising a third dielectric layer 33, a reflective layer 5, a second dielectric layer 32, a recording layer 4, a first dielectric layer 31 and a substrate 2 as formed on a supporting substrate 20 in that order. The supporting substrate 20 in FIG. 7 is made of a resin plate or a glass plate of which the thickness is enough to retain its shape by itself, like the substrate 2 in FIG. 1 to FIG. 6.

The order for laminating the layers of from the third dielectric layer 33 to the first dielectric layer 31 on the supporting substrate 20 may be the same as in the structure embodiment of FIG. 5 seen from the side to which recording/reproducing beam is applied (the side of the substrate 2).

The substrate 2 in FIG. 7 may be an adhesive sheet of a transparent resin, and this is attached to the layer 31. This is so thin that it cannot retain its shape by itself. Concretely, the thickness of the substrate 2 generally falls between 0.05 and 0.3 mm or so, though varying depending on the material forming it.

The thin substrate 2 as in FIG. 7 may be formed by attaching an adhesive sheet such as that mentioned above to the layer 31. Apart from this, it may also be formed by resin coating. The coating method is not specifically defined. For example, employable is spin-coating.

The medium of FIG. 7 has an absorption coefficient control structure. In this, therefore, it is desirable that the recording/reproducing beam applied to the medium does not substantially reflect on the supporting substrate 20 toward the recording layer 4. Accordingly, it is desirable that the supporting substrate 20 is transparent to the recording/reproducing beam to be applied to the medium or can absorb the light, or a light-absorbing layer capable of absorbing the recording/reproducing beam is disposed between the supporting substrate 20 and the third dielectric layer 33. Also in the structure embodiments of FIG. 4 to FIG. 6, it is desirable that the recording/reproducing beam applied to the medium does not substantially reflect on the protective layer 6 toward the recording layer 4. In these, therefore, it is desirable that the protective layer 6 is transparent to the recording/reproducing beam to be applied to the medium or can absorb the light, or a light-absorbing layer is disposed between the protective layer 6 and the third dielectric layer 33.

Recording/Reproducing Method

The optical recording medium of the present invention may be overwritten in the same manner as that for conventional phase change optical recording media.

Figure 8A:
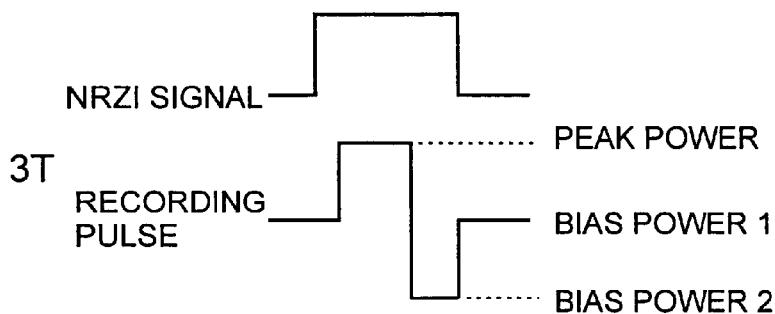
FIG. 8A and FIG. 8B are graphs each showing the modulation pattern of a laser beam to be used for overwriting the optical recording medium (reflection-type structure) of the invention.
Figure 8B:
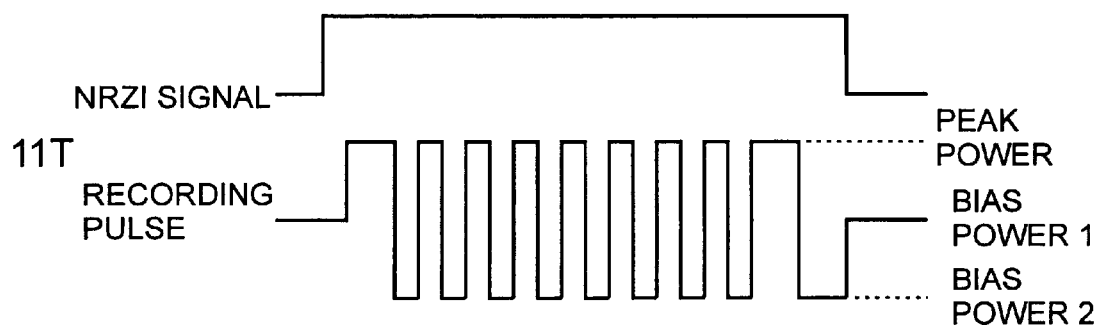

The modulation pattern of a laser beam favorable to reflection-type structure media is shown in FIG. 8A and FIG. 8B. The modulation pattern of FIG. 8A is for recording 3 T signals (recording pulse pattern); and that of FIG. 8B is for recording 11 T signals. In each drawing, the horizontal axis indicates the time, and the vertical axis indicates the power level of the laser beam. In each drawing, additionally shown are 3 T and 11 T NRZI signal patterns.

The power level in each modulation pattern is in three stages of $P_P$ (peak power), $P_{B1}$ (bias power 1) that is lower than $P_P$ and $P_{B2}$ (bias power 2) that is lower than $P_{B1}$. Pulse modulation of recording power has heretofore been effected. In the conventional pulse modulation, however, the bottom value of the recording pulse corresponds to the erasing power of $P_{B1}$. Being different from the conventional pulse modulation pattern, the patterns illustrated herein are characterized in that the recording pulse is up to the peak value $P_P$ and down to the bottom value $P_{B2}$, and that, after the final pulse irradiation, the power level is once lowered to the bottom value $P_{B2}$ and is then returned back to the erasing power level $P_{B1}$. Since the recording pulse pattern is as illustrated, the record marks formed are hardly deformed even in high-density recording, and the jitter of the medium is prevented from increasing.

$P_P$, $P_{B1}$ and $P_{B2}$ vary, depending on the composition of the recording layer and on the linear velocity of the medium, but generally fall between 9 and 12 mW, between 4 and 6 mW and between 0 and 2 mW, respectively. The recording power and the erasing power of the absorption coefficient control structure medium generally falls between 9 and 12 mW and between 4 and 6 mW, respectively.

For the optical recording medium of the invention in which the recording medium has the composition noted above, the recording/reproducing beam may be in a broad wavelength range, for example, falling between 100 and 5000 nm.

The invention is described in more detail with reference to the following Examples, which, however, are not intended to restrict the scope of the invention.

EXAMPLE 1

Reflection-Type Structure

Polycarbonate substrate discs 2 having a diameter of 120 mm and a thickness of 0.6 mm were produced through injection molding, in which were formed thereon grooves (width: 0.74 μm, depth: 65 nm, pitch: 1.48 μm). On the surface of each disc 2, formed were a first dielectric layer 31, a recording layer 4, a second dielectric layer 32, a reflective layer 5 and a protective layer 6 in that order according to the process mentioned below. Thus were produced optical recording disc samples having the structure of FIG. 2.

The dielectric layer 1a was formed through sputtering in an Ar atmosphere. The target used was of ZnS (80 mol %)—SiO$_2$ (20 mol %). The thickness of the dielectric layer 1a formed was 95 nm. The dielectric layer 1b of Ge$_3$N$_4$ was formed through reactive sputtering in a nitrogen-containing Ar atmosphere, in which Ge was used as the target. The thickness of the dielectric layer 1b was 20 nm.

The recording layer 4 was formed through sputtering. The composition of the recording layer in each sample is shown in Table 1 (in terms of atomic ratio). The thickness of the recording layer was 20 nm.

The second dielectric layer 32 was formed through reactive sputtering in an Ar atmosphere or in an (Ar+N$_2$) atmosphere, in which ZnS—SiO$_2$ was used as the target. The flow rate ratio, [N$_2$/(Ar+N$_2$)] is shown in Table 1. The thickness of the second dielectric layer was 22 nm.

The reflective layer 5 was formed through sputtering in an Ar atmosphere. The target used was of Al-1.7 atm. % Cr. The thickness of the reflective layer was 150 nm.

To form the protective layer 6, a UV-curable resin was irradiated onto the layer 5 through spin coating, and cured thereon through UV exposure. After having been cured, the protective layer had a thickness of 5 μm.

The samples thus produced were initialized with a bulk eraser, and then tested, using an optical recording medium tester (laser beam wavelength: 638 nm, numerical aperture: 0.6) in which the RBW (resolution band width) and the VBW (video band width) were fixed to be 30 kHz and 100 Hz, respectively, while the linear velocity of the sample was varied, to measure the C/N ratio of each sample. From the data thus measured, obtained was the value $V_{max}$ for each sample. The C/N ratio was measured according to the process mentioned below.

1) On the measurement track, 8/16 modulation signals were overwritten 10 times at a linear velocity $V_0$.

2) On the same measurement track, the signal of a single frequency (3 T signal: 4.88 MHz when $V_0$=6 m/sec) that corresponds to the shortest mark length of the mixed signals was recorded once.

3) On the same measurement track, the signal of a single frequency (14 T signal: 1.03 MHz when $V_0$=6 m/sec) that corresponds to the longest mark length was recorded once, and the C/N ratio of the thus-recorded sample was obtained.

4) The linear velocity $V_0$ was varied, and the steps 1) to 3) were repeated.

5) Based on the data thus measured in the process of 1) to 4), $V_0$ that gave the highest C/N ratio was determined, which is $V_{max}$.

The clock frequency to determine the signal length was so varied in accordance with the linear velocity $V_0$ that the recording density could be the same at every linear velocity.

Next, also using the same optical recording medium tester as above, 8/16 modulation signals were overwritten 10 times on each sample, at a linear velocity $V_0$ of 6 m/sec, and the jitter of each sample was measured. The value thus measured is the initial jitter value. The data of the jitter value thus obtained are shown in Table 1 along with $V_{max}$ and $V_{max}/V_0$. The jitter value is a total jitter (unit: %) as calculated relative to the clock frequency (58.36 MHz when $V_0$=6 m/sec).

Next, the samples were stored at 60° C. for 100 hours. The 8/16 modulation signals were overwritten once on each of those stored samples at a linear velocity $V_0$ of 6 m/sec, and the jitter of each overwritten sample was measured. The value measured is the jitter value of each stored sample. The data obtained are in Table 1.

For the measurement as above, the recording pulse used is as follows:

Recording Pulse

Pulse Pattern: as in FIG. 8A and FIG. 8B
Recording Power (peak power): 11.0 mW
Erasing Power (bias power 1); 5.0 mW
Bottom Power (bias power 2): 0.5 mW

TABLE 1

$v_o = 6$ [m/s]

| Sample No. | Composition of Recording Layer (atomic ratio) | Second Dielectric Layer $N_2/(Ar + N_2)$ | Vmax (m/s) | Vmax $/v_o$ | Jitter (%) Initial Value | Jitter (%) After Stored |
|---|---|---|---|---|---|---|
| 101 (comparison) | $Ge_{20}Sb_{26}Te_{54}$ | 0 | 5 | 0.83* | 8.8 | 20.0* |
| 102 | $Ge_{20}Sb_{26}Te_{54}$ | 0.12 | 7 | 1.17 | 7.3 | 8.8 |
| 103 | $Ge_{20}Sb_{26}Te_{54}$ | 0.19 | 8 | 1.33 | 14.0 | 14.0 |
| 104 (comparison) | $Ge_{20}Sb_{26}Te_{54}$ | 0.27 | 9 | 1.50* | 20.0* | 20.0* |

*) Outside the defined or preferred range.

From Table 1, it is known that the jitter of the samples having been so designed that the ratio $V_{max}/V_0$ falls within the defined range is satisfactorily small even after the samples were stored at high temperatures. The preferred range of the jitter is at most 15%. If the jitter is larger than 15%, the system could not run correctly, or is often out of order and produces many errors.

EXAMPLE 2
Absorption Coefficient Control Structure

Polycarbonate substrate discs 2 having a diameter of 120 mm and a thickness of 0.6 mm were produced through injection molding, in which were formed thereon grooves (width: 0.60 μm, depth: 50 nm, pitch: 1.20 μm). On the surface of each disc 2, formed were a first dielectric layer 31, a recording layer 4, a second dielectric layer 32, a reflective layer 5, a third dielectric layer 33 and a protective layer 6 in that order according to the process mentioned below. Thus were produced optical recording disc samples having the structure of FIG. 5.

The dielectric layer 1a was formed through sputtering in an Ar atmosphere. The target used was of ZnS (80 mol %)—$SiO_2$ (20 mol %). The thickness of the dielectric layer 1a formed was 240 nm. The dielectric layer 1b of $Ge_3N_4$ was formed through reactive sputtering in a nitrogen-containing Ar atmosphere, in which Ge was used as the target. The thickness of the dielectric layer 1b was 20 nm.

The recording layer 4 was formed through sputtering. The composition of the recording layer in each sample is shown in Table 2 (in terms of atomic ratio). The thickness of the recording layer was 20 nm.

The second dielectric layer 32 was formed through reactive sputtering in an Ar atmosphere or in an ($Ar+N_2$) atmosphere, in which ZnS (80 mol %)—$SiO_2$ (20 mol %) or Si was used as the target. The composition of the second dielectric layer and the flow rate ratio, $[N_2/(Ar+N_2)]$ during the layer formation are shown in Table 2. The thickness of the second dielectric layer was 15 nm.

The reflective layer 5 was formed through sputtering in an Ar atmosphere. The target used was of Si. The thickness of the reflective layer was 50 nm.

The third dielectric layer 33 was formed through sputtering in an Ar atmosphere. The target used was of ZnS (80 mol %)—$SiO_2$ (20 mol %). The thickness of the third dielectric layer was 60 nm.

The protective layer 6 was formed in the same manner as in Example 1.

The recording layer of each sample thus produced was initialized with a bulk eraser. After the protective layer 6 was removed, a laser beam (wavelength: 680 nm) was irradiated to each sample, while being directed to its substrate 2, and the transmittance of the thus-irradiated sample in its mirror region (crystalline region) was measured with a spectrophotometer. The transmittance thus measured was not smaller than 5%. Ac/Aa in each sample at a wavelength of 680 nm is not smaller than 0.9.

Each sample was tested, using an optical recording medium tester (this is the same as in Example 1 except that the laser beam wavelength was 680 nm) in which the RBW (resolution band width) and the VBW (video band width) were fixed to be 30 kHz and 100 Hz, respectively, while the linear velocity $V_0$ of the sample was varied, to measure the C/N ratio of each sample. From the data thus measured, obtained was the value $V_{max}$ for each sample. The C/N ratio was measured according to the process mentioned below.

1) On the measurement track, 1–7 RLL signals were overwritten 10 times at a linear velocity $V_0$.

2) On the same measurement track, the signal of a single frequency (2 T signal: 13.5 MHz when $V_0$=12 m/sec) that corresponds to the shortest mark length of the 1–7 RLL signals was recorded once.

3) On the same measurement track, the signal of a single frequency (8 T signal: 3.38 MHz when $V_0$=12 m/sec) that corresponds to the longest mark length was recorded once, and the C/N ratio of the thus-recorded sample was obtained.

4) The linear velocity $V_0$ was varied, and the steps 1) to 3) were repeated.

5) Based on the data thus measured in the process of 1) to 4), $V_0$ that gave the highest C/N ratio was determined, which is $V_{max}$.

The clock frequency to determine the signal length was so varied in accordance with the linear velocity $V_0$ that the recording density could be the same at every linear velocity.

Next, also using the same optical recording medium tester as above, 1–7 RLL signals were overwritten 10 times on each sample, at a linear velocity $V_0$ of 12 m/sec, and the bit error rate (BER) of each sample was measured. The value thus measured is the initial BER. The data of BER thus obtained are shown in Table 2 along with $V_{max}$ and $V_{max}/V_0$.

Next, the samples were stored at 60° C. for 100 hours. The 1–7 RLL signals were overwritten once on each of those stored samples at a linear velocity $V_0$ of 12 m/sec, and the BER of each overwritten sample was measured. The value measured is the BER of each stored sample. The data obtained are in Table 2.

TABLE 2

$v_o = 12$ [m/s]

| Sample No. | Composition of Recording Layer (atomic ratio) | Second Dielectric Layer Composition | $N_2/(Ar + N_2)$ | Vmax (m/s) | Vmax /$v_o$ | BER Initial Value | BER After Stored |
|---|---|---|---|---|---|---|---|
| 201 (comparison) | $Ge_{20}Sb_{26}Te_{54}$ | $ZnS-SiO_2$ | 0 | 12 | 1.00* | $7 \times 10^{-7}$ | $5 \times 10^{-5}$* |
| 202 | $Ge_{20}Sb_{26}Te_{54}$ | Si-N | 0.48 | 14 | 1.17 | $3 \times 10^{-7}$ | $5 \times 10^{-7}$ |
| 203 | $Ge_{20}Sb_{25}Te_{55}$ | Si-N | 0.48 | 16 | 1.33 | $1 \times 10^{-8}$ | $1 \times 10^{-8}$ |
| 204 (comparison) | $Ge_{21}Sb_{23}Te_{56}$ | Si-N | 0.48 | 18 | 1.50* | $4 \times 10^{-6}$* | $4 \times 10^{-6}$* |

*) Outside the defined or preferred range.

From the data in Table 2, it is known that the effect of the present invention is realized also in absorption coefficient control structure media. The preferred range of BER is at most $1 \times 10^{-6}$.

EXAMPLE 3

Absorption Coefficient Control Structure

Polycarbonate substrate discs 2 having a diameter of 120 mm and a thickness of 0.6 mm were produced through injection molding, in which were formed thereon grooves (width: 0.60 μm, depth: 50 nm, pitch: 1.20 μm). On the surface of each disc 2, formed were a first dielectric layer 31, a recording layer 4, a second dielectric layer 32, a reflective layer 5, a third dielectric layer 33 and a protective layer 6 in that order according to the process mentioned below. Thus were produced optical recording disc samples having the structure of FIG. 5.

The dielectric layer 1a was formed through sputtering in an Ar atmosphere. The target used was of ZnS (85 mol %)—$SiO_2$ (15 mol %). The thickness of the dielectric layer 1a formed was 195 nm. The dielectric layer 1b of $Si_3N_4$ was formed through reactive sputtering in a nitrogen-containing Ar atmosphere, in which Si was used as the target. The thickness of the dielectric layer 1b was 5 nm.

The recording layer 4 was formed through sputtering. The composition (in terms of atomic ratio) of the recording layer in each sample (No. 301, No. 401, and No. 501) is shown in Table 3, Table 4 and Table 5, respectively. The thickness of the recording layer was 16 nm.

The second dielectric layer 32 was formed through sputtering in an (Ar+$N_2$) atmosphere, in which Si was used as the target. The thickness of the second dielectric layer was 15 nm.

The reflective layer 5 was formed through sputtering in an Ar atmosphere. The target used was of Si. The thickness of the reflective layer was 50 nm.

The third dielectric layer 33 was formed in the same manner as that for the dielectric layer 1a mentioned above, except that its thickness was 60 nm.

The protective layer 6 was formed in the same manner as in Example 1.

The recording layer of each sample thus produced was initialized with a bulk eraser. After the protective layer 6 was removed, a laser beam (wavelength: 680 nm) was irradiated to each sample, while being directed to its substrate 2, and the transmittance of the thus-irradiated sample in its mirror region (crystalline region) was measured with a spectrophotometer. The transmittance thus measured was not smaller than 5%. Ac/Aa in each sample at a wavelength of 680 nm is not smaller than 0.9.

$V_{max}$ for each sample was measured in the same manner as in Example 2.

Next, the shortest mark length (2 T signal) mentioned above was recorded on each sample at a linear velocity of $V_0$, and then the longest mark length (8 T signal) was overwritten thereon, whereupon the carrier variation in the shortest mark length was measured, from which was obtained the erasability of each sample. This is the initial erasability. Next, the samples were stored at 60° C. for 100 hours, and the erasability of each sample was measured in the same manner as previously. This is the erasability of each stored sample. The initial erasability of each sample and the erasability of each stored sample are in Table 3, Table 4 and Table 5, along with $V_0$, $V_{max}$ and $V_{max}/V_0$. In addition, the initial C/N ratio of each sample and the C/N ratio of each stored sample at each linear velocity are also in these Tables.

TABLE 3

Sample No. 301
Vmax = 12 [m/s]
Composition of Recording Layer: $Ge_{20}Sb_{26}Te_{54}$

| $V_o$ (m/s) | Vmax /$V_o$ | C/N (dB) Initial Value | C/N (dB) After Stored | Erasability (dB) Initial Value | Erasability (dB) After Stored |
|---|---|---|---|---|---|
| 8 | 1.50* | 54.2 | 54.8 | 26.2 | 26.5 |
| 10 | 1.20 | 56.4 | 54.3 | 27.0 | 24.6 |
| 12 | 1.00* | 56.8 | 55.8 | 25.9 | 21.5* |
| 14 | 0.86* | 55.0 | 53.8 | 23.5 | 17.8* |
| 16 | 0.75* | 53.9 | 52.2 | 21.3 | 15.9* |
| 18 | 0.67* | 51.3 | 48.5 | 17.1 | 10.2* |

*Outside the defined or preferred range.

TABLE 4

Sample No. 401
Vmax = 14 [m/s]
Composition of Recording Layer: $Ge_{20}Sb_{24}Te_{54}$

| $V_o$ (m/s) | Vmax /$V_o$ | C/N (dB) Initial Value | C/N (dB) After Stored | Erasability (dB) Initial Value | Erasability (dB) After Store |
|---|---|---|---|---|---|
| 8 | 1.75* | 53.2 | 53.4 | 26.0 | 26.1 |
| 10 | 1.40 | 55.3 | 55.3 | 26.5 | 25.5 |
| 12 | 1.17 | 56.1 | 55.4 | 26.8 | 23.0 |
| 14 | 1.00* | 56.5 | 55.7 | 26.1 | 22.1* |
| 16 | 0.88* | 55.4 | 54.1 | 23.4 | 19.2* |
| 18 | 0.78* | 53.7 | 52.1 | 21.5 | 16.8* |

*Outside the defined or preferred range.

TABLE 5

Sample No. 501
Vmax = 16 [m/s]
Composition of Recording Layer: $Ge_{20}Sb_{25}Te_{35}$

| $V_o$ (m/s) | Vmax /$V_o$ | C/N (dB) Initial Value | C/N (dB) After Stored | Erasability (dB) Initial Value | Erasability (dB) After Store |
|---|---|---|---|---|---|
| 8 | 2.00* | 51.0 | 50.6 | 25.3 | 25.2 |
| 10 | 1.60* | 54.1 | 53.9 | 26.2 | 26.0 |
| 12 | 1.33 | 55.8 | 55.3 | 26.5 | 25.8 |
| 14 | 1.14 | 56.1 | 55.9 | 26.0 | 23.4 |
| 16 | 1.00* | 56.8 | 56.4 | 25.1 | 22.8* |
| 18 | 0.89* | 55.4 | 54.3 | 24.2 | 20.4* |

*Outside the defined or preferred range.

From the data in these Tables, it is known that the absorption coefficient control structure medium of the invention that satisfies the requirement of $1<V_{max}/V_0$ has an erasability of not smaller than 23 dB even after having been stored at high temperatures.

As in the Tables above, when $V_{max}/V_0 \geq 1.5$, the erasability of the stored samples is high. However, BER of those samples is larger than $1\times10^{-6}$ owing to their self-erase.

For the samples tested herein, $V_{max}$ was varied by changing the composition of the recording layer and by controlling the flow rate ratio $[N_2/(Ar+N_2)]$ in forming the second dielectric layer.

Japanese Patent Application Nos. 9-368036, 10-175418 and 10-350764 are herein incorporated by reference.

While the invention has been described in detail and with reference to specific embodiments thereof, it will be apparent to one skilled in the art that various changes and modifications can be made therein without departing from the spirit and scope thereof.

What is claimed is:

1. An optical recording medium having a recording layer of a phase change type, which is applied to driving units for overwriting it at a linear velocity of $V_0$;

the medium being so designed as to satisfy the following requirement:

$1<V_{max}/V_0<1.5$ wherein $V_{max}$ indicates the linear velocity at which the medium being overwritten has a highest C/N ratio.

2. The optical recording medium as claimed in claim 1, in which the recording layer is formed on a substrate, a first dielectric layer is formed between the substrate and the recording layer, a second dielectric layer is formed on the recording layer, and at least the region of the second dielectric layer adjacent to the recording layer contains nitrogen, and to which recording/reproducing beam is irradiated from the substrate.

3. The optical recording medium as claimed in claim 2, wherein said region consists essentially of zinc sulfide and silicon oxide, or of silicon nitride and/or germanium nitride.

4. The optical recording medium as claimed in any of claims 1 to 3, which has the first dielectric layer, the phase change recording layer and the second dielectric layer on the surface of the substrate in that order and for which recording/reproducing beam is irradiated to the back surface of the substrate;

the medium satisfying the following requirement:

$Ac/Aa \geq 0.8$ wherein Ac indicates the light absorption of the medium at the recording/reproducing beam wavelength in the crystalline region of the recording layer, and Aa indicates the light absorption of the medium at the same in the amorphous region of the recording layer.

5. The optical recording medium as claimed in claim 4, which, when record marks are formed on its recording layer and the medium is then stored at a temperature higher than room temperature for at least 100 hours and thereafter overwritten on the record marks, has an erasability for the record marks of not lower than 23 dB in terms of its absolute value.

6. The optical recording medium as claimed in claim 5, which is stored at a temperature falling between 60 and 80° C. after the record marks are formed thereon.

7. A method for overwriting an optical recording medium having a recording layer of a phase change type, wherein;

the recording medium is overwritten at a linear velocity of $V_0$ that satisfies the following requirement:

$1<V_{max}/V_0<1.5$ where $V_{max}$ indicates the linear velocity at which the medium being overwritten has a highest C/N ratio.

8. The method for overwriting an optical recording medium as claimed in claim 7, wherein the recording medium is formed on a substrate, a first dielectric layer is formed between the substrate and the recording layer, a second dielectric layer is formed on the recording layer, and at least the region of the second dielectric layer adjacent to the recording layer contains nitrogen, and to which a recording/reproducing beam is irradiated from the substrate.

9. The method for overwriting an optical recording medium as claimed in claim 8, wherein said region consists essentially of zinc sulfide and silicon oxide, or of silicon nitride and/or germanium nitride.

10. The method for overwriting an optical recording medium as claimed in any of claims 7 to 9, which has the first dielectric layer, the phase change recording layer and the second dielectric layer on the surface of the substrate in that order and for which a recording/reproducing beam is irradiated to the back surface of the substrate;

the medium satisfying the following requirement:

$Ac/Aa \geq 0.8$ wherein Ac indicates the light absorption of the medium at the recording/reproducing beam wavelength in the crystalline region of the recording layer, and Aa indicates the light absorption of the medium at the same in the amorphous region of the recording layer.

11. The method for overwriting an optical recording medium as claimed in claim 10, which, when record marks are formed on its recording layer and the medium is then stored at a temperature higher than room temperature for at least 100 hours and thereafter overwritten on the record marks, has an erasability for the record marks of not lower than 23 dB in terms of its absolute value.

12. The method for overwriting an optical recording medium as claimed in claim 11, which is stored at a temperature falling between 60 and 80° C. after the record marks are formed thereon.

* * * * *